Nov. 15, 1938.  W. S. MARTIN  2,136,451
INCINERATION
Filed Dec. 1, 1936
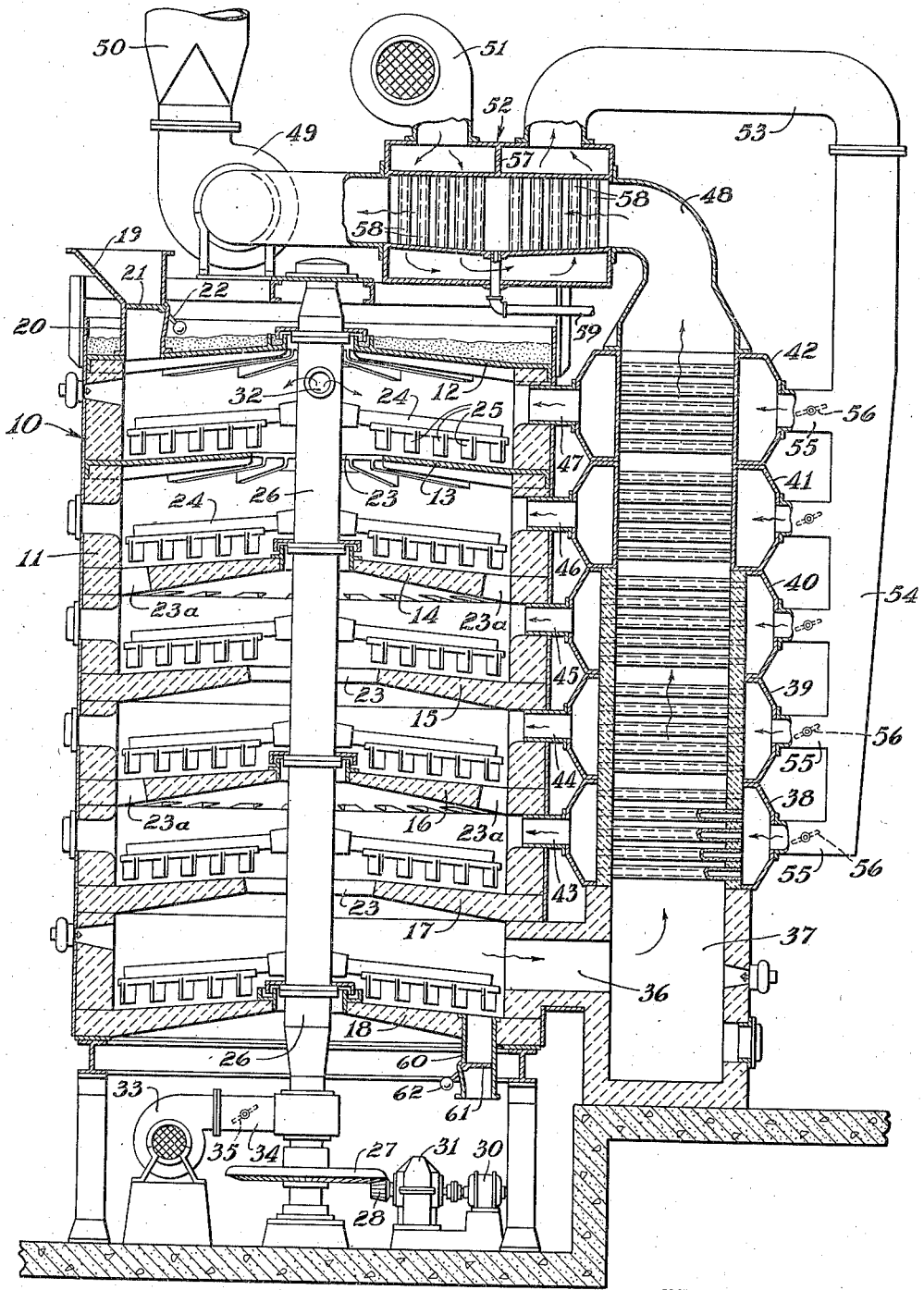
INVENTOR
WARREN S. MARTIN
BY
his ATTORNEY Patented Nov. 15, 1938

2,136,451

UNITED STATES PATENT OFFICE 2,136,451

INCINERATION

Warren S. Martin, Bayside, N. Y., assignor, by mesne assignments, to Underpinning & Foundation Company, Inc., New York, N. Y., a corporation of New York Application December 1, 1936, Serial No. 113,588

9 Claims. (Cl. 110—8)

This invention relates to incineration and more particularly to improvements in tiered multiple-hearth furnaces and to improvements in processes for drying and burning material by passing it downwardly through a plurality of zones, gradually drying it in upper zones and then burning it in lower zones.

Although the apparatus and process of the present invention are suitable for use with many kinds of material, they are of particular value in drying and burning waste material such as garbage and sewage material including sewage sludge and sewage screenings both of which have a substantial moisture content.

The principal objects of the invention are to provide novel and advantageous forms of apparatus and processes for treatment of material of the general character specified. Another object relates to the efficient utilization of the heat of the combustion gases in heating air supplied to the various compartments of the furnace. Another object relates to heating various streams of air supplied to the furnace to different degrees so as to make the temperatures of the streams conform more nearly to the temperatures in the compartments into which the various streams of air are supplied. A further object of the invention relates to the provision of means for regulating the flow in the various streams at points where the temperatures are relatively low. A further object of the invention relates to the provision of a plurality of heat exchange sections through which the hot gases of combustion are passed in series and serve to heat the air passing through these sections to temperatures corresponding to the drop in temperature of the combustion gases as they pass through the various sections in series. A further object of the invention relates to the reduction in temperature of the hot gases of combustion by bringing them in succession into heat exchange relationship with streams of air supplied to the various compartments of a multiple-hearth furnace and the utilization of the heat remaining in the gases of combustion to preheat the air later brought into heat exchanging relationship with the combustion gases as the air is passed in separate streams to the various compartments of the furnace. An important feature of the invention relates to the use of metal hearths in the upper part of the furnace where damp material is liable to come into contact therewith, thus avoiding any damage which might result from bringing the wet material into contact with hearths of porous refractory material.

In carrying out the invention, use may be made of a tiered multiple-hearth furnace of which one or more trays or hearths in the upper part thereof may be of metal to avoid damage when wet material is introduced and the other hearths may be of any suitable refractory material. In the furnace, material introduced at the top may be worked downwardly from hearth to hearth through central outlets for every other hearth and peripheral outlets for the remaining hearths, and material on the hearths may be agitated and moved towards the outlets of said hearths by suitable rabbling devices preferably supported and operated by a hollow vertical shaft located substantially at the vertical axis of the furnace. The furnace may be of the down-draft type and air may be introduced into a compartment at the upper part of the furnace in any suitable manner, preferably through openings in the hollow shaft supporting the rabbling devices.

The air introduced in the upper part of the furnace is drawn downwardly in a flow concurrent with that of the solid material and may be drawn out at the lower part of the furnace into a gas combustion chamber and then passed through a plurality of heat exchange sections corresponding in number to hearths into above which preheated air is to be introduced. As the gases pass in succession through the heat exchange sections, the temperature of the gases drops and the heat withdrawn from the hot gases of combustion is greatest in the first section and less for each succeeding section. Separate streams of air are forced through the lower temperature portions of these heat exchange sections and supplied to successive hearths, the stream of air at the highest temperature entering a lower compartment and a stream of air at the lowest temperature entering an upper compartment of the furnace. By placing dampers in the air ducts, at points so as to control the air flow before reaching the heat exchange sections, destructive effects of heat on the dampers are avoided.

Although the temperature of the combustion gases is very greatly reduced in passing through the heat exchange sections, advantage may be taken of the heat remaining in the combustion gases by passing these gases through a heat exchange device to preheat a stream of air which is later subdivided to provide the various streams of air flowing through the different heat exchange sections of the series previously referred to. The furnace may be provided with burners at the different compartments and also with doors to provide access into the compartments and the combustion chamber may also be provided with a burner and with a door for access into its interior.

Further objects, features and advantages will appear upon consideration of the following description and of the drawing in which the figure is a view in vertical section of apparatus embodying a preferred form of the present invention.

Referring to the drawing, there is disclosed an apparatus comprising a multiple-hearth furnace 10, having a peripheral wall 11, a top 12, and hearths 13, 14, 15, 16, 17 and 18 of which the hearth 18 serves as the bottom of the furnace. Preferably the top 12 and the hearth 13 are of metal, so as to be impervious to any moisture in the material, and are reenforced as by radial ribs at their lower ends. The top 12 may be used for drying material before it is introduced into the furnace and it is therefore desirable to have the top of suitable heating conducting material as well as material impervious to moisture.

Material may be supplied at the top of the furnace by means of a hopper 19 and a chute 20 extending through the top 12, the chute being provided with a gas seal which may be in the form of a pivoted door or gate 21 normally held in closed position by a weighted arm 22 as illustrated. Material introduced through the chute 20 passes into the upper compartment of the furnace and falls on the hearth 13 near its periphery and is then agitated and moved inwardly to a central outlet 23 by one or more rabbling devices each of which comprises a radial arm 24 and inclined blades 25 extending downwardly therefrom, each arm 24 being supported and actuated by a hollow vertical shaft 26 passing through the central part of the outlet 23. Actuation of the shaft 26 may be effected by means of a bevel gear 27 thereon, a bevel gear 28 meshing with the bevel gear 27 and actuated from any suitable source of power as by means of a motor 30 acting through a speed reducer 31.

The furnace is of the down-draft type and air may be supplied into the upper part thereof in any suitable manner but preferably is supplied to the uppermost compartment of the furnace through one or more discharge openings or nozzles 32, from the interior of the hollow shaft 26. Air is supplied to the lower end of the shaft by a fan 33 which forces air to the lower end of the shaft 26 through a duct 34 provided with a damper 35.

From the lower part of the furnace, preferably the lowermost zone, the hot gases pass through a duct 36 into a gas combustion chamber 37 where the combustible gases are burned and any noxious odors developed in the drying and burning operations that are not eliminated in the lower or burning zones of the furnace are finally eliminated. From the gas combustion chamber 37, the hot gases of combustion are drawn in succession through a plurality of heat exchange sections 38, 39, 40, 41 and 42 which are utilized to heat streams of air introduced above the hearths 17, 16, 15, 14 and 13 respectively through corresponding ducts 43, 44, 45, 46, and 47 leading from the heat receiving parts of the heat exchange sections. From the heat exchange sections the gases at lower temperatures are drawn through a duct 48 by means of an induced draft fan 49 and discharged into a flue or stack 50.

Preferably the gases passing through the duct 48 are utilized to preheat air supplied to the various heat exchange sections for introduction to the various compartments of the furnace. To this end air is forced by a fan 51 through a heat exchange device 52 interposed in the duct 48 and then through a duct 53 to a manifold 54 from which branches 55 lead to the heat receiving parts of the heat exchangers 38, 39, 40, 41 and 42, the flow of air through the various branches being controlled by dampers 56. In order to obtain good heating effects from the cooled combustion gases, the heat exchange device or heat exchanger 52 may be divided into sections by a partition 57 and the air may pass through these sections in series, the air passing through tubes 58 in each of these sections and the current of combustion gases passing around said tubes in contact with the outer surfaces thereof. In passing through the heat exchanger 52 the temperature may be reduced sufficiently to produce condensation of vapors in the combustion gases. Liquid thus condensed in the combustion gas duct of the heat exchanger may be collected in sump at the bottom of said duct and drained therefrom through a pipe 59.

Below the hearth 13 the hearths 15 and 17 are provided with corresponding central outlets 23, the hearths 14 and 16 are provided with a plurality of peripheral outlets 23a, and the hearth 18 is provided with a peripheral outlet chute 60 controlled by a pivoted door or gate 61 normally held closed by a weighted arm 62. The rabbling devices over hearths 15 and 17 are similar to those over hearth 13 but above hearths 14, 16 and 18 the inclination of the blades 25 is such as to work the material outwardly.

Sludge to be incinerated is dewatered, as by filtration by a vacuum filter, and is then passed either directly or after additional drying to the incinerator. In using the incinerator or furnace of the present invention, the material may be supplied continuously to the hopper 19, is intermittently fed past the gate 21 into the compartment above the hearth 12, and falls on this hearth. It is then rabbled inwardly and outwardly over successive hearths and passed downwardly from one to another until it is discharged from the furnace through the chute 60 and past the gate 61. The furnace is of the downdraft type, the temperatures in the various compartments rising from zone to zone downwardly through the furnace.

Air may be supplied to the upper part of the furnace in any suitable manner. In one way, air is passed upwardly through the hollow central shaft 26 and discharged through one or more outlets into the uppermost compartment or zone, above the hearth 13. This air serves to cool the shaft and is heated in passing upwardly through the furnace. Preheated air may be supplied to individual compartments by passing combustion gases from the lowermost compartment of the furnace through the gas combustion chamber 37 and then in series through the heat exchange sections or units 38, 39, 40, 41 and 42 and the heat exchanger 52, air preheated by the heat exchanger 52 being passed in separate streams, under control by dampers 56, through the heat exchange sections 38, 39, 40, 41 and 42, into the compartments above the hearths 17, 16, 15, 14 and 13 at suitable temperatures. It will be evident that this apparatus is very efficient in drying and burning material of the class described and that heat generated in the operation is utilized to great advantage.

It will be seen that in the lowermost heat exchanger section 38 the air to be introduced into the lower-most compartment of the furnace is raised to a high temperature thus facilitating combustion and causing the combustion gases to be discharged at higher temperatures into the gas combustion chamber. Consequently the temperatures in the combustion chamber and in the heat exchanger section 38 are raised and the air passing through section 38 is raised to a higher temperature than before, thus building up the temperatures to as high a degree as practicable. Similar results may be obtained in connection with the other heat exchanger sections and the corresponding compartments of the furnace. Obviously, the rise in temperature in the drying compartments and preliminary burning compartments will aid in raising the temperature in the final burning compartment. By thus utilizing the heat of combustion and building up the temperature, complete burning may be obtained without the use of any auxiliary fuel except when starting the drying and burning operation.

It should be understood that various changes may be made and that certain features may be used without others without departing from the true scope and spirit of the invention.

Having thus described my invention, I claim:

1. In combination with a tiered multiple-hearth furnace comprising a plurality of vertically-spaced hearths dividing the furnace into a plurality of compartments and having outlets, rabbling means, comprising a hollow vertical shaft, for keeping the material in layers on successive hearths and working it to the outlets to feed material downwardly from hearth to hearth to the bottom where the solid residue is discharged, means for supplying air to the upper part of said furnace through said hollow shaft and means for withdrawing hot combustion gases from the lower part of the furnace, a heat exchange section receiving hot combustion gases from the lower part of the furnace and supplying preheated air to a lower compartment of the furnace and a second heat exchange section receiving hot combustion gases from the first heat exchange section and supplying preheated air to a higher compartment.

2. In combination with a tiered multiple-hearth furnace comprising a plurality of vertically-spaced hearths dividing the furnace into a plurality of compartments and having outlets, rabbling means, comprising a hollow vertical shaft, for keeping the material in layers on successive hearths and working it to the outlets to feed material downwardly from hearth to hearth to the bottom where the solid residue is discharged, means for supplying air to the upper part of said furnace through said hollow shaft and means for withdrawing hot combustion gases from the lower part of the furnace, a heat exchange section receiving hot combustion gases from the lower part of the furnace and supplying preheated air to a lower compartment of the furnace, a second heat exchange section receiving hot combustion gases from the first heat exchange section and supplying preheated air to a higher compartment, and means for varying the amount of air supplied to one of said heat exchange sections for preheating.

3. In combination with a tiered multiple-hearth furnace comprising a plurality of vertically-spaced hearths dividing the furnace into a plurality of compartments and having outlets, rabbling means for keeping the material in layers on successive hearths and working it to the outlets to feed material downwardly from hearth to hearth to the bottom where the solid residue is discharged, means for supplying air to one compartment of said furnace and means for withdrawing hot combustion gases from another compartment of the furnace, a plurality of heat exchange sections through which the hot combustion gases pass in series with a temperature drop for each section and through which separate streams of air are passed for preheating, and means for leading preheated air from the first heat exchange section to a high-temperature compartment of the furnace, from the second section to a lower temperature compartment and from other lower temperature heat exchange sections to corresponding compartments.

4. In combination with a down-draft multiple-hearth furnace divided into compartments by vertically spaced hearths and having means for maintaining material in layers on said hearths and feeding it downwardly from hearth to hearth, means for withdrawing hot gases of combustion from the lower part of said furnace, a plurality of heat exchange units through which the hot combustion gases are passed in series with resultant falls in temperature, means for supplying separate streams of air to the heat exchange units for heating to corresponding temperatures and means for directing such streams of preheated air to successive compartments, with the hottest of said streams passing to a lower compartment and the other streams of said separate streams at successively decreasing temperatures to other compartments taken in their order of decreasing temperatures.

5. In combination with a down-draft multiple-hearth furnace divided into compartments by vertically spaced hearths and having means for maintaining material in layers on said hearths and feeding it downwardly from hearth to hearth, means for withdrawing hot gases of combustion from the lower part of said furnace, a plurality of heat exchange units through which the hot combustion gases are passed in series with resultant falls in temperature, means for supplying separate streams of air to the heat exchange units for heating to corresponding temperatures, means for directing such streams of preheated air to successive compartments, with the hottest of said streams passing to a lower compartment and the other streams of said separate streams at successively decreasing temperatures to other compartments taken in their order of decreasing temperatures, and means for varying the flow in said streams.

6. The process of incineration which comprises passing material of high moisture content downwardly through a plurality of zones while first drying and then burning the same, temporarily retaining the material in each zone, moving the material substantially horizontally through each of said zones, discharging the gaseous products of combustion from the lowermost zone, passing the gaseous products of combustion into heat exchange relationship with a plurality of successive streams of air to preheat them to temperatures falling from the first to the last of said streams and passing the hottest air stream into a lower zone and the other air streams into zones of correspondingly lower temperature.

7. The process of incineration which comprises passing material of high moisture content downwardly through a plurality of zones while first drying and then burning the same, temporarily retaining the material in each zone, moving the material substantially horizontally through each of said zones, discharging the gaseous products of combustion from the lowermost zone, passing the gaseous products of combustion into heat exchange relationship with a plurality of successive streams of air to preheat them to temperatures falling from the first to the last of said streams, passing the hottest air stream into a lower zone and the other air streams into zones of correspondingly lower temperature, and preheating air by heat interchange with the interior of the lower zones and supplying it to the uppermost zone.

8. The process of incineration which comprises passing material of high moisture content downwardly through a plurality of zones while first drying and then burning the same, temporarily retaining the material in each zone, discharging the gaseous products of combustion from the lowermost zone, dividing a main supply stream of air into a plurality of air streams, passing the gaseous products of combustion into heat exchange relationship with said plurality of air streams in succession and then into heat exchange relationship with said main stream, and passing the hottest of said plurality of air streams into a lower zone and the others into zones of correspondingly lower temperature.

9. In combination with a down-draft multiple hearth furnace divided into compartments by vertically spaced hearths and having means for maintaining material in layers on said hearths and feeding it downwardly from hearth to hearth, means for withdrawing hot gases of combustion from the lower part of the furnace, means for supplying a main stream of air and dividing it into a plurality of separate streams, a plurality of heat exchangers to heat air passed into different compartments, means for directing such separate streams through the corresponding heat exchangers into different compartments, and means for passing said combustion gases through said heat exchangers in series from the lowermost to the uppermost to heat the air streams passing therethrough, a heat exchanger for heating the main stream and means for passing the combustion gases through the last mentioned heat exchanger after passing through said plurality of heat exchangers.

WARREN S. MARTIN.